United States Patent
Potignano

(10) Patent No.: US 10,844,933 B2
(45) Date of Patent: Nov. 24, 2020

(54) AUTOMATIC MANUAL TRANSMISSION AND METHOD FOR THE SAME

(71) Applicant: Antonio Potignano, Teggiano (IT)

(72) Inventor: Antonio Potignano, Teggiano (IT)

(*) Notice: Subject to any disclaimer, the term of this patent is extended or adjusted under 35 U.S.C. 154(b) by 331 days.

(21) Appl. No.: 15/756,073

(22) PCT Filed: Mar. 27, 2017

(86) PCT No.: PCT/IB2017/051735
§ 371 (c)(1),
(2) Date: Feb. 28, 2018

(87) PCT Pub. No.: WO2017/168305
PCT Pub. Date: Oct. 5, 2017

(65) Prior Publication Data
US 2018/0266519 A1   Sep. 20, 2018

(30) Foreign Application Priority Data

Mar. 31, 2016 (IT) .................. 102016000033340
Dec. 5, 2016 (IT) .................. 102016000123155

(51) Int. Cl.
*F16H 3/00* (2006.01)
*F16H 3/12* (2006.01)
(Continued)

(52) U.S. Cl.
CPC ............... *F16H 3/006* (2013.01); *F16H 3/08* (2013.01); *F16H 3/089* (2013.01); *F16H 3/093* (2013.01); *F16H 3/12* (2013.01); *F16H 2003/0803* (2013.01); *F16H 2003/0931* (2013.01); *F16H 2003/0933* (2013.01); *F16H 2200/0052* (2013.01); *F16H 2200/0056* (2013.01); *F16H 2306/18* (2013.01); *F16H 2306/48* (2013.01); *F16H 2306/50* (2013.01)

(58) Field of Classification Search
CPC ................................... F16H 3/12; F16H 3/089
See application file for complete search history.

(56) References Cited

U.S. PATENT DOCUMENTS 5,030,179 A * 7/1991 Ganoung ................ F16H 3/006
                                                                    475/50
9,206,862 B2 * 12/2015 Mepham ................. F16D 23/06

FOREIGN PATENT DOCUMENTS

DE   102010030573 A1 * 12/2011 ............. B60K 6/547
DE   102014011921 A1 *  2/2016 ............. F16H 3/006
WO   WO-2017168305 A1 * 10/2017 ............... F16H 3/12

* cited by examiner

Primary Examiner — Terence Boes

(57) ABSTRACT

An automatic manual transmission comprising: a first sub-transmission configured for establishing even-numbered (2nd, 4th, 6th) gears and the reverse gear by a plurality of gear pairs (42/52, 44/54, 46/56, 40/50), and a second sub-transmission configured for establishing odd-numbered (1th, 3rd, 5th, 7th) gears by a plurality of gear pairs (41/51, 43/53, 45/55, 47/57); one or more output shafts (14, 15); one or more intermediate shafts (71, 72, 73, 74) each of which is coaxially and rotatably mounted either to an input shaft (11, 12) or to an output shaft (14, 15) and kinematically interposed between an output shaft and an input shaft; wherein said first sub-transmission is connected and disconnected to and from the output of the transmission by means of a first synchronizer (S1), and said second sub-transmission is connected and disconnected to and from the output of the transmission by means of a second synchronizer (S2).

6 Claims, 7 Drawing Sheets

(51) Int. Cl.
*F16H 3/093* (2006.01)
*F16H 3/089* (2006.01)
*F16H 3/08* (2006.01)
F16H 61/04 (2006.01)
F16H 61/688 (2006.01)

Fig. 4

|     | C1 | C2 | K1 |    | S1 |    | K2 |    | K3 |    | S2 |    |
|     |    |    | 52 | 56 | 71 | 72 | 54 | 50 | 51 | 55 | 73 | 53 |
| --- | -- | -- | -- | -- | -- | -- | -- | -- | -- | -- | -- | -- |
| R   | ●  |    |    |    |    |    | ●  | ●  |    |    |    |    |
| I   |    | ●  | ○  |    |    |    |    |    | ●  |    | ●  |    |
| II  | ●  |    | ●  |    | ●  |    |    |    | ○  |    |    |    |
| III |    | ●  | ○  |    |    |    | ○  |    |    |    |    | ●  |
| IV  | ●  |    |    |    |    | ●  | ●  |    |    | ○  |    |    |
| V   |    | ●  |    |    | ○  |    | ○  |    |    | ●  | ●  |    |
| VI  | ●  |    |    |    | ●  | ●  |    |    |    | ○  |    |    |

Fig. 5

|      | C1 | C2 | K1 |    | S1 |    | K2 |    | K3 |    | S2 |    | K4 |    |
|      |    |    | 52 | 56 | 71 | 72 | 54 | 50 | 51 | 55 | 73 | 74 | 53 | 57 |
| ---- | -- | -- | -- | -- | -- | -- | -- | -- | -- | -- | -- | -- | -- | -- |
| R    | ●  |    |    |    |    |    | ●  | ●  |    |    |    |    |    |    |
| I    |    | ●  | ○  |    |    |    |    |    | ●  |    | ●  |    |    |    |
| II   | ●  |    | ●  |    | ●  |    |    |    | ○  |    |    |    | ○  |    |
| III  |    | ●  | ○  |    |    |    | ○  |    |    |    |    |    | ●  | ●  |
| IV   | ●  |    |    |    |    | ●  | ●  |    |    | ○  |    |    | ○  |    |
| V    |    | ●  |    |    | ○  |    | ○  |    |    | ●  | ●  |    |    |    |
| VI   | ●  |    |    |    | ●  | ●  |    |    |    | ○  |    |    |    | ○  |
| VII  |    | ●  | ○  |    |    |    |    |    |    |    |    | ●  |    | ●  |

Fig. 8

| | C1 | C2 | K1 | | S1 | | K2 | | K3 | | S2 | | K4 | |
|---|---|---|---|---|---|---|---|---|---|---|---|---|---|---|
| | | | 52 | 56 | S1a | S1b | 50 | 54 | 51 | 55 | S2a | S2b | 53 | 57 |
| R | ● | | | | | ● | ● | | | | | | | |
| I | | ● | ○ | | | | | | ● | | ● | | | |
| II | ● | | ● | | ● | | | | | ○ | | | ○ | |
| III | | ● | ○ | | | | | ○ | | | | ● | ● | |
| IV | ● | | | | | ● | | ● | | ○ | | | ○ | |
| V | | ● | | ○ | | | | ○ | | | ● | ● | | |
| VI | ● | | | ● | ● | | | | | ○ | | | | ○ |
| VII | | ● | | ○ | | | | | | | | ● | | ● |

Fig. 9

| | C1 | C2 | K1 | | S1 | | K2 | | K3 | | S2 | | K4 | |
|---|---|---|---|---|---|---|---|---|---|---|---|---|---|---|
| | | | 42 | 46 | 71 | 72 | 40 | 44 | 41 | 45 | 73 | 74 | 43 | 47 |
| R | ● | | | | | ● | ● | | | | | | | |
| I | | ● | ○ | | | | | | ● | | ● | | | |
| II | ● | | ● | | ● | | | | | ○ | | | ○ | |
| III | | ● | ○ | | | | | ○ | | | | ● | ● | |
| IV | ● | | | | | ● | | ● | | ○ | | | ○ | |
| V | | ● | | ○ | | | | ○ | | | ● | ● | | |
| VI | ● | | | ● | ● | | | | | ○ | | | | ○ |
| VII | | ● | | ○ | | | | | | | | ● | | ● |

AUTOMATIC MANUAL TRANSMISSION AND METHOD FOR THE SAME

TECHNICAL FIELD

The present invention relates to an automatic manual transmission for vehicles.

BACKGROUND ART

Automatic manual transmission refers to a transmission capable of automatically performing the functions of a manual transmission, generally by means of an electronically controlled electro-mechanical or electro-hydraulic actuation system, achieving the advantages of both a manual transmission and an automatic transmission.

A way to realize this type of transmission is the so-called double-clutch transmission (commonly referred to as "DCT"), which is essentially an automatic manual transmission where two sub-transmissions are combined in a single gearbox: one of the two units produces odd-numbered speed ratios, while the other produces even-numbered speed ratios. In a DCT there are two clutches: one connects the engine to the input shaft of the sub-transmission with the odd-numbered gears, the other connects the engine to the input shaft of the sub-transmission with the even-numbered gears. In this way, each one of the two sub-transmissions defines a separate transmission path to transfer the power of the engine from the input to the output of the transmission and so to drive wheels. While driving in a certain gear, only one clutch is engaged and only the corresponding sub-transmission is active and transmits the torque of the engine to the drive wheels. A gear shifting is then accomplished by engaging the idle gearwheel, corresponding to the desired gear, in the inactive sub-transmission prior to the shift event and, subsequently, the clutch associated with the active sub-transmission (off-going clutch) is slowly released while the clutch associated with the inactive sub-transmission (oncoming clutch) is at the same time engaged. As the engagement-disengagement of the two clutches overlaps, there is no interruption in transfer of power. This working principle is known as "clutch-to-clutch power-shift"; i.e. an automated gear shifting, without power interruption and with clutch-to-clutch switching in torque transfer. The mechanical engagement of each gear is typically performed by means of actuators which operate on synchronizers.

The process of engaging the idle gearwheel corresponding to the desired gear in the inactive sub-transmission by means of a synchronizer before the gear shifting, can be defined as "gear preselection". In this way, it is possible to automate the transmission and, at the same time, to achieve uninterrupted power gear shifts with the high mechanical efficiency of a manual transmission. However, together with the automatic gear shift mode, most of DCTs still provide a semi-automatic manual gear shift mode. The two gear shift modes differ in gear preselection strategy: in the automatic gear shift mode, gear preselection is automatically done by the DCT system right before a gear shifting takes place; while in manual gear shift mode, gear preselection is automatically done by DCT system right after the prior gear shifting has been executed in order to guarantee the readiness for the next gear shifting. Although the first gear preselection strategy is also used in manual gear shift mode (comfort mode), but with a longer duration of the gear shift process, the second is preferred in case of sports cars in order to have a quick response to any inputs from the driver (sporty mode). However, the sporty manual gear shift mode has some drawbacks:

higher fuel consumption due to viscous drag losses in the clutch which runs idle in case of clutches in an oil bath;
 errors in gear preselection caused by incorrect estimation by the DCT system of driver's intentions resulting in a longer shifting duration;
 increased workload of DCT system to repeatedly preselect the next gear;
 increased noise from operation of the shifting mechanism, i.e. the noise that can occur when a synchronizer engages a gearwheel; an action which is out of synchrony with the actual gear-shifts and that takes place repeatedly during the running of the vehicle.

To provide a double-clutch transmission which avoids aforesaid inconveniences, a solution is to use an alternative gear preselection strategy in which, after the gear shift command executed by the driver, a seamless gear shifting is achieved by simultaneously (or almost simultaneously) activating the engagement of the idle gearwheel corresponding to the next gear, by means of a synchronizer, and the clutch-to-clutch power-shift in order to eliminate, or to reduce, the gap between gearwheel engagement and gear shifting.

The variation of pressure p over time t in the pressure chamber of the oncoming clutch (dashed line "e") and in the pressure chamber of the off-going clutch (dash-dot line "d"), for a typical clutch-to-clutch power-shift in a DCT with electro-hydraulic clutch actuation, is schematically shown in FIG. 2. As shown in FIG. 2, after the shift signal, during the phase "a" (filling phase), the pressure in the oncoming clutch increases, the clutch piston starts to move until the operating clearance is overcome, the clutch plates (drive plates and driven plates) come in contact ("kiss point") and the clutch begins to transfer torque. After the oncoming clutch has reached the kiss point, during the phase "b" (overlapping phase), the pressure in the off-going clutch decreases, while the pressure in the oncoming clutch increases: the engine torque is transferred through the two clutches simultaneously, while neither of the two clutches is completely engaged. During the phase "c" (synchronization phase) the pressure in the off-going clutch is brought to zero, while the pressure in the oncoming clutch is continuously updated and the clutch slips until it reaches the synchronization point of the new gear. Afterwards, the pressure is raised to the normal system pressure and the clutch sticks.

The duration of the filling phase (100-200 milliseconds) in the oncoming clutch is compatible with the duration of a synchronizer engagement process, which is very short, approximately less than 100 milliseconds. Therefore, it is possible to achieve a seamless gear shifting in which the engagement of the synchronizer and the clutch-to-clutch power-shift are activating simultaneously, so as to eliminate the gap between gearwheel engagement and gear shifting, by overlapping the engagement of the synchronizer to the filling phase of the oncoming clutch. However, this procedure requires the simultaneous control of both gearwheel engagement and filling process in the oncoming clutch; and the engagement of the synchronizer must be completed before the oncoming clutch reaches the kiss point, otherwise the transmission of frictional torque over the clutch can negatively affect the process with the risk of not being able to engage the synchronizer, in fact a drag torques of only 10 Nm can hinder synchronizer engagement and this can easily occur when the clutch reaches the kiss point.

On the other hand, the filling process in oncoming clutch is a major source of uncertainty, since its control involves precise control of both pressure and time, and to determine, with high accuracy, the so-called "take-off point" (i.e. the hydraulic pressure which causes the clutch piston to start to move) and "kiss point" (i.e. the hydraulic pressure for which the clutch plates come in contact and begin to transmit torque); that is to say a precise control of the clutch piston motion. Therefore, establishing the correct fill pressure and the correct fill time are critical to achieve a good gear shift process and any error in determining the two parameters can cause an overfill or an under-fill, both of which can cause the failure of the synchronization in the switching between the clutches, negatively affecting the quality of gear shifts and their impact on driving quality. A method of operating a DCT which avoids such inconveniences, can be achieved by holding the clutch of the inactive sub-transmission at the kiss point, so as to shift gear without the need of bringing the ongoing clutch at the kiss point. All this requires very high performance from synchronizers and it may be considerably expensive and complex, particularly in a transmission that has a high number of gears.

DISCLOSURE OF INVENTION

According to the present invention, an automatic manual transmission is provided which is free from the above described drawbacks.

Therefore, it is an object of the present invention to provide a double-clutch transmission in which, irrespective of the number of gears, the output of the transmission (or, alternatively, the input of the transmission) is connected to all the odd-numbered gears by means of a first synchronization and engagement device and to all the even-numbered gears by means of a second synchronization and engagement device. It is a further object of the present invention a method of operating a double-clutch transmission in which the "gear preselection" is executed so that the lower gear and the higher gear, with respect to a current gear, are both engaged at the same time and independently of each other. It is a further object of the present invention a method of operating a double-clutch transmission in which the engagement of a next gear, through the actuation of a synchronizer, overlaps the filling phase of the pressure chamber in the ongoing clutch. It is a further object of the present invention a method of operating a double-clutch transmission in which, during the running of the vehicle, the inactive clutch is held at the contact point of the clutch plates so that the filling phase of the pressure chamber in the oncoming clutch can be eliminated.

In order to accomplish these objects, the present invention provides a double-clutch transmission in which the sub-transmission with the even-numbered gears comprises a first set of selectively engageable torque-transmitting coupling devices to preselect the gears and is connected to the output (or to the input) of the transmission by means of a first synchronization and engagement device; while the sub-transmission with the odd-numbered gears comprises a second set of selectively engageable torque-transmitting coupling devices to preselect the gears and is connected to the output (or to the input) of the transmission by means of a second synchronization and engagement device. In order to make it possible to preselect at the same time the lower gear and the higher gear, the coupling devices are arranged so that each of them is coupled to the driven gears of two adjacent gear pairs which define either two non-consecutive even-numbered gears separated by a single intermediate even-numbered gear, or two non-consecutive odd-numbered gears separated by a single intermediate odd-numbered gear. This forms a two stages gear shift system where the two stages are connected by intermediate shafts, coaxial to the output (or input) shafts, that carry the coupling devices and link the same coupling devices to the synchronization devices. The gear shift process takes place in two phases. In the first phase the idle gearwheels associated to the lower gear and to the higher gear, with respect to the current gear and by means of the coupling devices, are engaged in the inactive sub-transmission right after the prior gear shifting (so that both gears are preselected at the same time and independently of each other), while the associated synchronization and engagement device is placed in the idle position in order to mechanically separate the sub-transmission from the output shafts (or from the input shafts, depending on the embodiment), thus making it possible to hold the inactive clutch at the contact point. In the second phase, which takes place after the shift command, the effective gear shifting takes place by means of the operation of the appropriate synchronization and engagement device which select the gear to engage between the preselected lower and higher gears and connects the output shaft to the upstream stages of the kinematic chain (or the input shaft to the downstream stages of the kinematic chain, depending on the embodiment), the suspension of torque transmission through the clutch associated to the current gear and the starting of torque transmission through the clutch associated to the successive gear.

According to a method of operating a DCT in accordance with the present invention, during the running of the vehicle, the clutch associated to the inactive sub-transmission is held at the contact point. Within the frame of this patent application, the contact point is the lowest hydraulic pressure level (e.g. kiss point pressure) in the clutch actuation system, for which clutch plates and disks are in contact (i.e. the clutch is closed) and the clutch does not slip while it drags, in its rotation, the input shaft of the inactive sub-transmission. In this way, the filling phase in the ongoing clutch during gear-shifts is suppressed and the time required for such filling phase is instead used for synchronizer engagement, and so it is possible to shift gear without the need of bringing the ongoing clutch at the kiss point. A gear shift is therefore executed by engaging the successive gear in the inactive sub-transmission and, immediately after, switching the torque transmission between the two clutches by progressively opening the clutch which is associated to the active sub-transmission, and progressively increasing the torque transmitted through the clutch which is associated to the inactive sub-transmission, until the former is at the contact point and the latter is completely engaged. It should be appreciated that, if a DCT with electro-hydraulic clutch actuation is operated in such a manner, the synchronizer engagement starts right after the gear shifting command, so the driver feels immediately such action as a slight variation in rotation speed of the engine and in longitudinal acceleration of the vehicle, and he/she does not perceive any delay in gear shifting. Instead, in a conventional DCT, between the moment in which the driver sends the gear shifting command and the moment in which actually starts the gear shifting, there is a certain delay time interval needed to bring the ongoing clutch at the kiss point. Such delay is felt by drivers as an annoying stand-by period with no action, especially by drivers used to manual gearboxes.

It should be appreciated that, in each of the described embodiments of the present invention, the task of said coupling devices is to engage an idle gearwheel with an intermediate shaft that, at the time when the engagement process takes place (i.e. right after a gear shift), rotates idle. Moreover, the variation of the engine speed resulting from a gear shift (both in upshift and in downshift) decreases the difference in rotational speed between the idle gearwheel and the intermediate shaft that are to be engaged. As a result, the inertia of the parts that are to be connected and the load required for their synchronization are very small and therefore a very simple and inexpensive type of synchronizer can be used, or alternative types of coupling devices (such as dog clutches or any type of suitable progressive or non-progressive coupling device), while only the two synchronization and engagement devices which connect each separate sub-transmission to the output shafts are to be of high performance.

These and other objects, features and advantages of the invention will become more apparent from the following description of the preferred embodiments in conjunction with the accompanying drawings.

BRIEF DESCRIPTION OF DRAWINGS

The present invention will now be described with reference to the accompanying drawings, which show four non-limitative embodiments thereof, wherein:

FIG. 4 is a table showing engagement of clutches, synchronizers and coupling devices of the automatic manual transmission shown in FIG. 1 in the various gears;

FIG. 5 is a table showing engagement of clutches, synchronizers and coupling devices of the automatic manual transmission shown in FIG. 3 in the various gears;

FIG. 8 is a table showing engagement of clutches, synchronizers and coupling devices of the automatic manual transmission shown in FIG. 6 in the various gears;

FIG. 9 is a table showing engagement of clutches, synchronizers and coupling devices of the automatic manual transmission shown in FIG. 7 in the various gears;

In the tables shown in FIG. 4, FIG. 5, FIG. 8 and FIG. 9 the symbol "●" indicates the engaged state of the active parts (i.e. the parts that transmit the power of the engine) and the symbol "0" indicates the engaged state of the inactive parts (i.e. the parts that do not transmit the power of the engine).

BEST MODE FOR CARRYING OUT THE INVENTION

Figure 1:
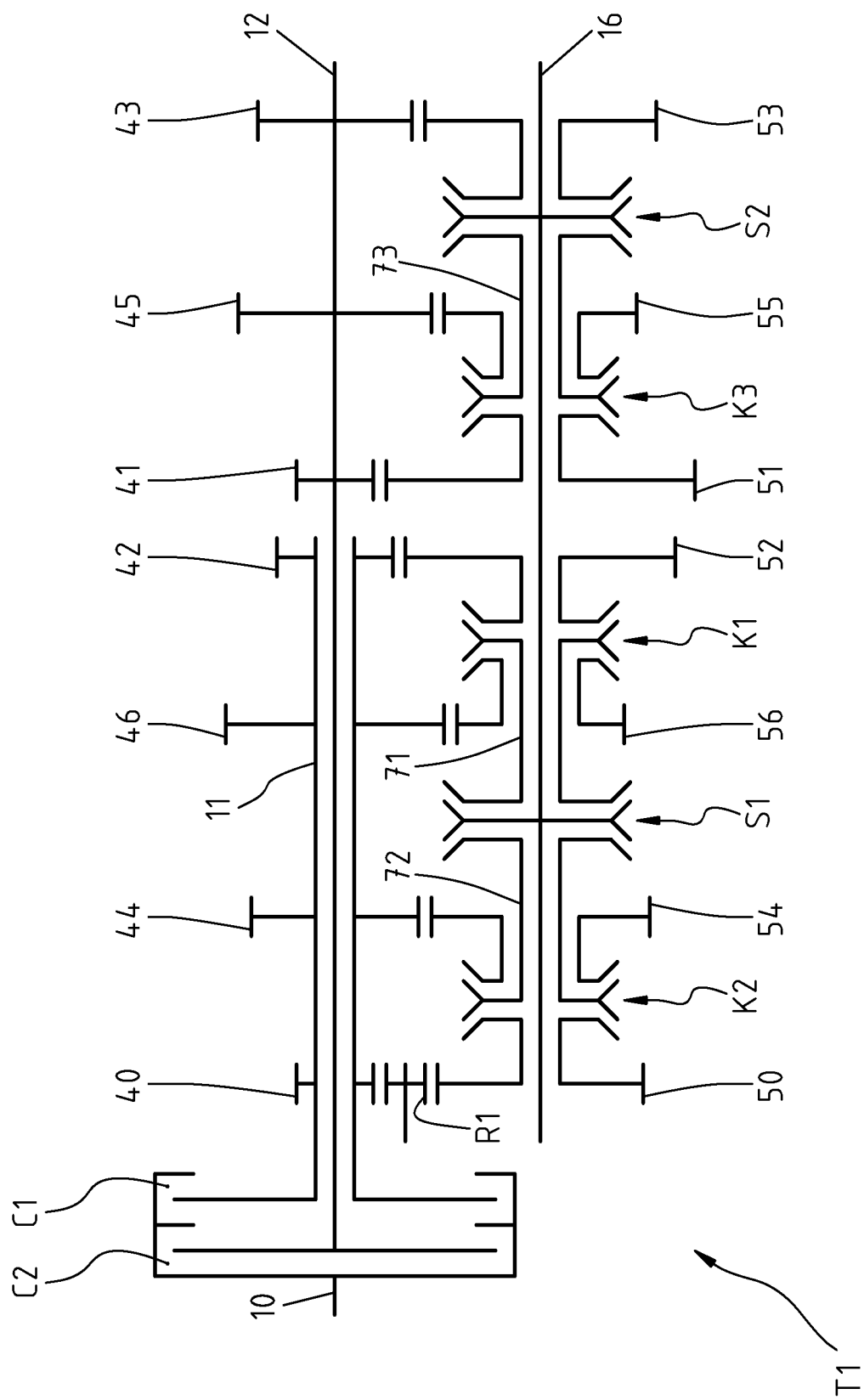
FIG. 1 is a schematic drawing illustrating an automatic manual transmission in accordance with an embodiment of the present invention.
Figure 2:
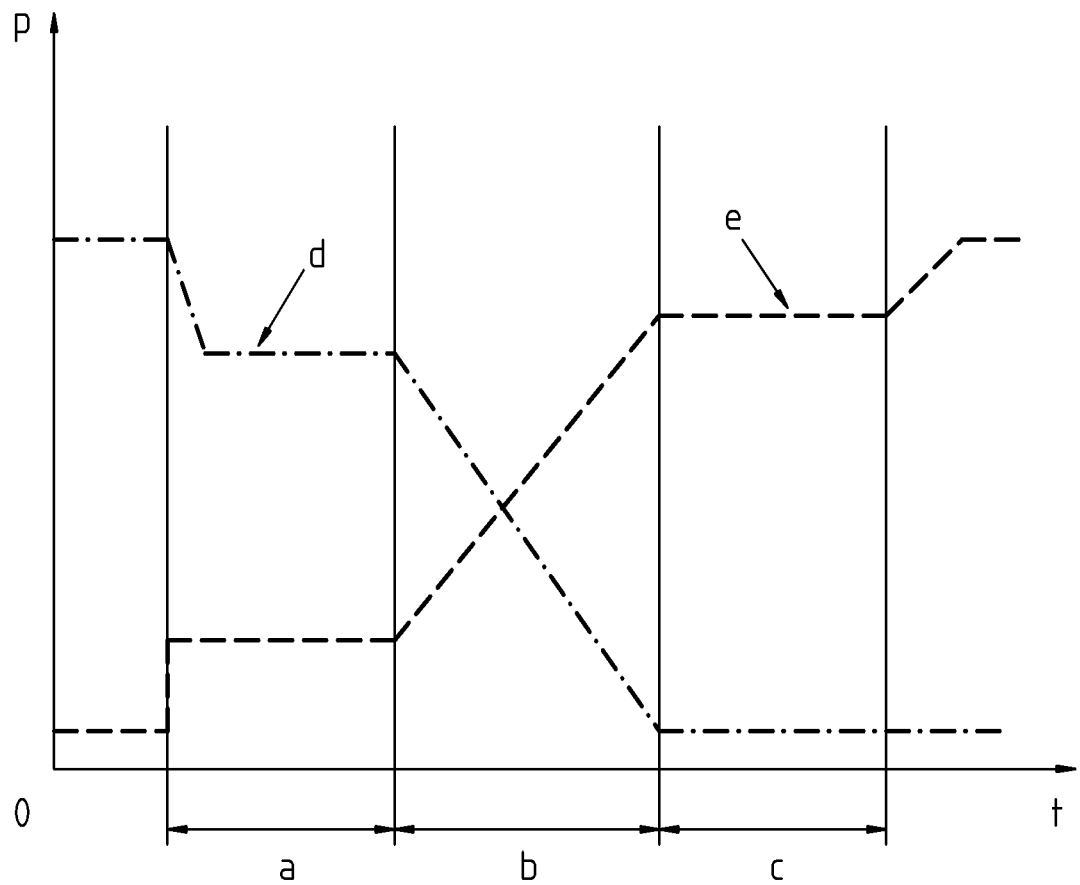
FIG. 2 is a diagram illustrating schematically the time evolution of the pressure in the oncoming clutch and in the off-going clutch for a gear shifting in a DCT with electro-hydraulic clutch actuation system.

Referring to FIG. 1, the automatic manual transmission T1 in accordance with an embodiment of the present invention is a double-clutch transmission which includes: a driving shaft 10, through which the torque of an engine is transmitted to a clutch unit that includes a first friction clutch C1, mounted between the driving shaft 10 and a first input shaft 11 and configured to transmit or interrupt the torque of the engine, and a second friction clutch C2 mounted between the shafts 10 and a second input shaft 12 and configured to transmit or interrupt the torque of the engine; drive gears 42, 44, 46 and 40, fixedly mounted to the first input shaft 11; drive gears 41, 43 and 45, fixedly mounted to the second input shaft 12; an output shaft 16, which is connected to a differential (not shown) that transmits the motion to drive wheels (not shown); intermediate shafts 71, 72 and 73, coaxially and rotatably mounted to the shaft 16; driven gears 50, 51, 52 and 53, idly mounted to the shaft 16; driven gear 55 idly mounted to the shaft 73; driven gear 56 idly mounted to the shaft 71; driven gear 54 idly mounted to the shaft 72; a reverse idle gear R1 meshes with the drive gear 40 and the driven gear 50 to realize the reverse rotation of the output shaft 16; a two-way coupling device K1 mounted to the shaft 71 and configured to selectively connect the gear 52 or the gear 56 to the shaft 71; a two-way coupling device K2 mounted to the shaft 72 and configured to selectively connect the gear 54 or the gear 50 to the shaft 72; a two-way coupling device K3 mounted to the shaft 73 and configured to selectively connect the gear 51 or the gear 55 to the shaft 73; a first synchronization and engagement device S1 consisting of a double-sided synchronizer mounted to the output shaft 16 and configured to selectively connect the shaft 71 or the shaft 72 to the shaft 16; a second synchronization and engagement device S2 consisting of a double-sided synchronizer mounted to the output shaft 16 and configured to selectively connect the shaft 73 or the gear 53 to the shaft 16.

The two input shafts 11 and 12 are independent, coaxial to each other and inserted one within the other. Each drive gear, 41, 42, 43, 44, 45 and 46, permanently meshes with the corresponding driven gear: 51, 52, 53, 54, 55 and 56, respectively. Each selectively engageable torque-transmitting coupling device, K1, K2, and K3, has two engaging position in each of which it engages a respective gear, and an idle position. Each synchronizer, S1 and S2, has two engaging position in each of which it engages a respective intermediate shaft or gear, and an idle position.

Within the frame of this patent application the expressions "fixedly mounted" with respect to a gear (a gear wheel) mounted on a shaft means that the gear is mounted to the shaft in a rotationally restrained manner so as to rotate with the shaft as an integral part, while the expressions "idly mounted" means that the gear is mounted to the shaft in a rotationally free manner as idle gear; and the neutral position of torque-transmitting coupling devices (K1, K2, K3, K4) and of synchronization and engagement devices (S1, S2), in which the device is in a rest state where it does not engage any gear or shaft, is defined as "idle position".

In order to realize the transmission ratios of six forward speeds and one reverse speed, the whole is configured so that: the torque of the engine is transmitted to the first input shaft 11 or to the second input shaft 12 through the clutches C1 and C2 respectively; the motion passes: from drive gears 41, 43 and 45 to the respective driven gears 51, 53 and 55, from gears 51 and 55 to the intermediate shaft 73 by means of the operation of the coupling device K3, from the intermediate shaft 73 and the driven gear 53 to the output shaft 16 by means of the operation of the synchronizer S2; the motion passes: from driving gears 40, 42, 44 and 46 to the respective driven gears 50, 52, 54 and 56, and so to the intermediate shafts 71 and 72 by means of the operation of coupling devices K1 and K2, and to the output shaft 16 by means of the operation of the synchronizer S1.

The operation of clutches and coupling and synchronization devices of the double-clutch transmission of FIG. 1 is shown in the table of FIG. 4, where the reverse gear is indicated by the letter R, the six forward gears are indicated by Roman numerals (first gear I, second gear II, third gear III, fourth gear IV, fifth gear V and sixth gear VI), "●" indicates the engaged state of the parts (clutches C1 and C2; synchronizers S1 and S2 with the gearwheel or the intermediate shaft engaged; coupling devices K1, K2 and K3 with the gearwheel engaged) that are active and transmit the power of the engine (i.e. the current gear), and "○" indicates the engaged state of the parts that do not transmit the power of the engine (i.e. preselected lower and higher gears). The operation of the double-clutch transmission of FIG. 1, configured as above, is described below. Specifically, the engagement modes of the reverse speed R and the six forward speeds I-VI (in upshift from the first speed I to the six speed VI), starting from an idle condition in which no gear is engaged, are described.

When the transmission is to be operated in the reverse speed R, the coupling device K2 engages the gear 50, the synchronizer S1 engages the shaft 72 and the first clutch C1 is operated to transmit the torque of the engine to the input shaft 11. As a result, the motion is transmitted to the output shaft 16 via the reverse speed drive gear 40, the reverse idle gear R1 and the reverse speed driven gear 50 in reverse rotation.

When the transmission is to be operated in the first forward speed I, the coupling device K3 engages the gear 51, the synchronizer S2 engages the shaft 73 and the second clutch C2 is operated to transmit the torque of the engine to the second input shaft 12. As a result, the motion is transmitted to the output shaft 16 via the first speed drive gear 41 and the first speed driven gear 51. Further, the coupling device K1 is operated to preselect the power transmission path for the second forward speed II by engaging the gear 52.

To shift to the second forward speed II, the synchronizer S1 engages the shaft 71, the transmission of the engine torque is switched from the clutch C2 to the clutch C1, and thus to the first input shaft 11, and the synchronizer S2 is placed in the idle position. As a result, the motion is transmitted to the output shaft 16 via the second speed drive gear 42 and the second speed driven gear 52. Further, the coupling device K3 is held in an engaged state with the gear 51 to retain the preselection of the power transmission path for the first forward speed I.

To shift to the third forward speed III, the synchronizer S2 engages the gear 53, the transmission of the engine torque is switched from the clutch C1 to the clutch C2, and thus to the second input shaft 12, and the synchronizer S1 is placed in the idle position. As a result, the motion is transmitted to the output shaft 16 via the third speed drive gear 43 and the third speed driven gear 53. Further, the coupling device K1 is held in an engaged state with the gear 52 to retain the preselection of the power transmission path for the second forward speed II and the coupling device K2 is operated to preselect the power transmission path for the fourth forward speed IV by engaging the gear 54.

To shift to the fourth forward speed IV, the synchronizer S1 engages the shaft 72, the transmission of the engine torque is switched from the clutch C2 to the clutch C1, and thus to the first input shaft 11, and the synchronizer S2 is placed in the idle position. As a result, the motion is transmitted to the output shaft 16 via the fourth speed drive gear 44 and the fourth speed driven gear 54. Further, the coupling device K3 is operated to preselect the power transmission path for the fifth forward speed V by engaging the gear 55.

To shift to the fifth forward speed V, the synchronizer S2 engages the shaft 73, the transmission of the engine torque is switched from the clutch C1 to the clutch C2, and thus to the second input shaft 12, and the synchronizer S1 is placed in the idle position. As a result, the motion is transmitted to the output shaft 16 via the fifth speed drive gear 45 and the fifth speed driven gear 55. Further, while the coupling device K2 is held in an engaged state with the gear 54 to retain the preselection of the power transmission path for the fourth forward speed IV, the coupling device K1 is operated to preselect the power transmission path for the sixth forward speed VI by engaging the gear 56.

To shift to the sixth forward speed VI, the synchronizer S1 engages the shaft 71, the transmission of the engine torque is switched from the clutch C2 to the clutch C1, and thus to the first input shaft 11, and the synchronizer S2 is placed in the idle position. As a result, the motion is transmitted to the output shaft 16 via the sixth speed drive gear 46 and the sixth speed driven gear 56. Further, the coupling device K3 is held in an engaged state with the gear 55 to retain the preselection of the power transmission path for the fifth forward speed V.

Figure 3:
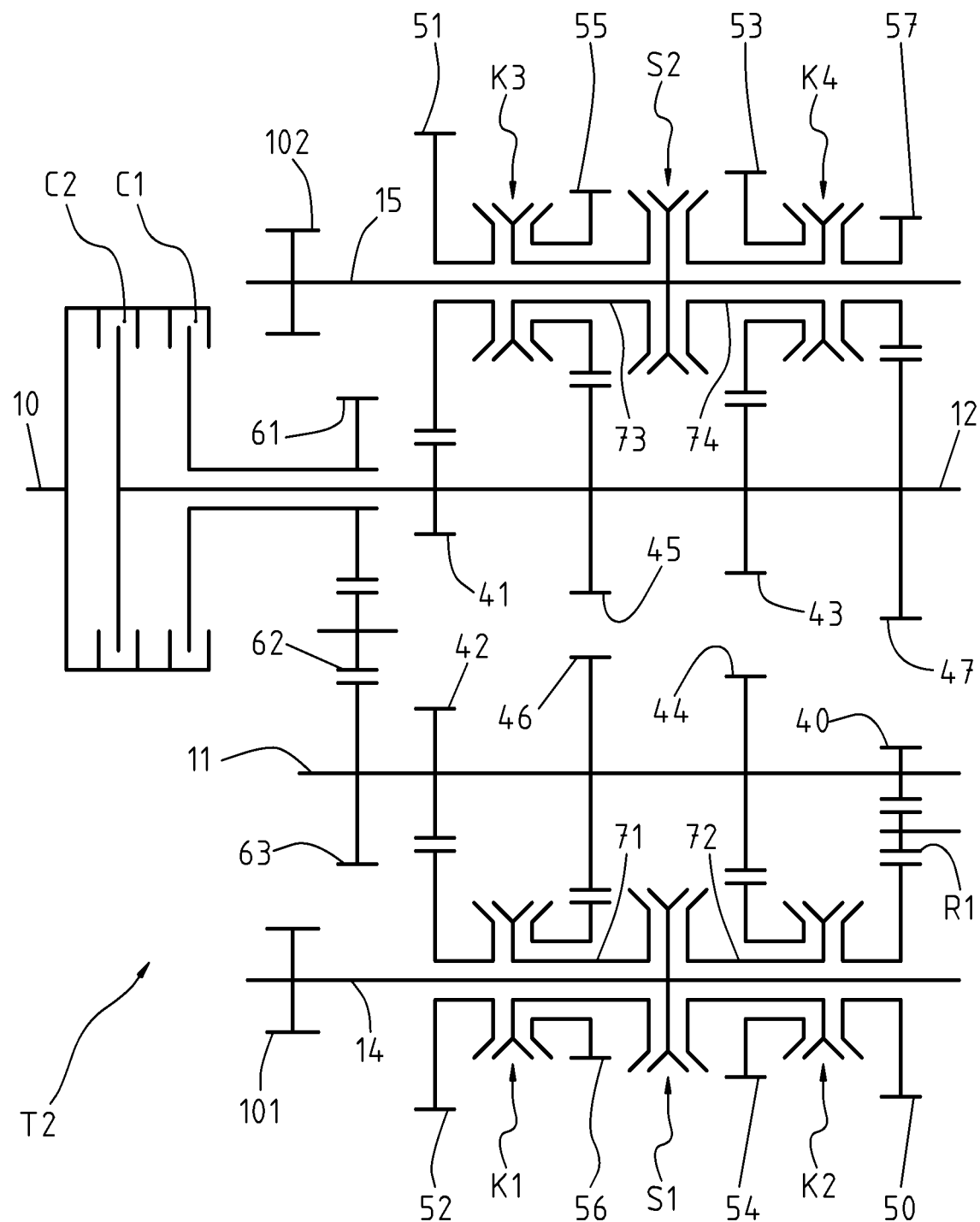
FIG. 3 is a schematic drawing illustrating an automatic manual transmission in accordance with a second embodiment of the present invention.

Referring now to FIG. 3, it is a schematic drawing illustrating a double-clutch transmission T2, in accordance with a second embodiment of the present invention, wherein the first input shaft 11 is radially spaced apart and arranged in parallel from and to the shaft 12; the shaft 11 receives the torque of the engine via the first clutch C1, a drive gear 61, an idle gear 62, and a driven gear 63 fixedly mounted to the shaft 11 itself; the intermediate shafts 71 and 72 are coaxially and rotatably mounted to a first output shaft 14; the driven gears 50 and 52 are fixedly mounted to the first output shaft 14; the double-sided synchronizer S1 is mounted to the first output shaft 14 and configured to selectively connect the shaft 71 or the shaft 72 to the shaft 14; the intermediate shaft 73 is coaxially and rotatably mounted to a second output shaft 15; driven gears 51 and 57 are idly mounted to the second output shaft 15; the driven gear 53 is idly mounted to an intermediate shaft 74 which is coaxially and rotatably mounted to the shaft 15; a two-way coupling device K4 is mounted to the shaft 74 and configured to selectively connect the gear 53 or the gear 57 to the shaft 74; the double-sided synchronizer S2 is mounted to the second output shaft 15 and configured to selectively connect the shaft 73 or the shaft 74 to the shaft 15; a first final drive gear 101 and a second final drive gear 102 are fixedly mounted to the shaft 14 and to the shaft 15 respectively; the output shafts 14 and 15 are connected via the gears 101 and 102 to a differential device (not shown) that transmits the motion to drive wheels (not shown). Other characteristics of the above-mentioned components in this second embodiment are substantially the same as in the previous embodiment. Other components of this second embodiment are substantially the same as in the previous embodiment; they are indicated by the same reference characters and will not be described in detail again.

In order to realize the transmission ratios of seven forward speeds and one reverse speed, the whole is configured so that: the torque of the engine is transmitted to the first input shaft 11 or to the second input shaft 12 through the clutches C1 and C2 respectively; the motion passes from drive gears 40, 42, 44 and 46 to the respective driven gears 50, 52, 54 and 56, and so to the shafts 71 and 72 by means of operation of coupling devices K1 and K2, and to the output shaft 14 by means of the operation of the synchronizer S1; the motion passes from drive gears 41, 43, 45 and 47 to the respective driven gears 51, 53, 55 and 57, and so to the intermediate shafts 73 and 74 by means of the operation of coupling devices K3 and K4, and to the output shaft 15 by means of the operation of the synchronizer S2.

The operation of clutches and coupling and synchronization devices in this second embodiment is shown in the table of FIG. 5, where the reverse gear is indicated by the letter R, the seven forward gears are indicated by Roman numerals (first gear I, second gear II, third gear III, fourth gear IV, fifth gear V, sixth gear VI and seventh gear VII), "●" indicates the engaged state of the parts (clutches C1 and C2; synchronizers S1 and S2 with the intermediate shaft engaged; coupling devices K1, K2, K3 and K4 with the gearwheel engaged) that are active and transmit the power of the engine (i.e. the current gear), and "○" indicates the engaged state of the parts that do not transmit the power of the engine (i.e. preselected lower and higher gears). The operation of this second embodiment of the present invention is substantially the same of the previous embodiment of FIG. 1, with the obvious differences, therefore it will not be described in detail again.

Figure 6:
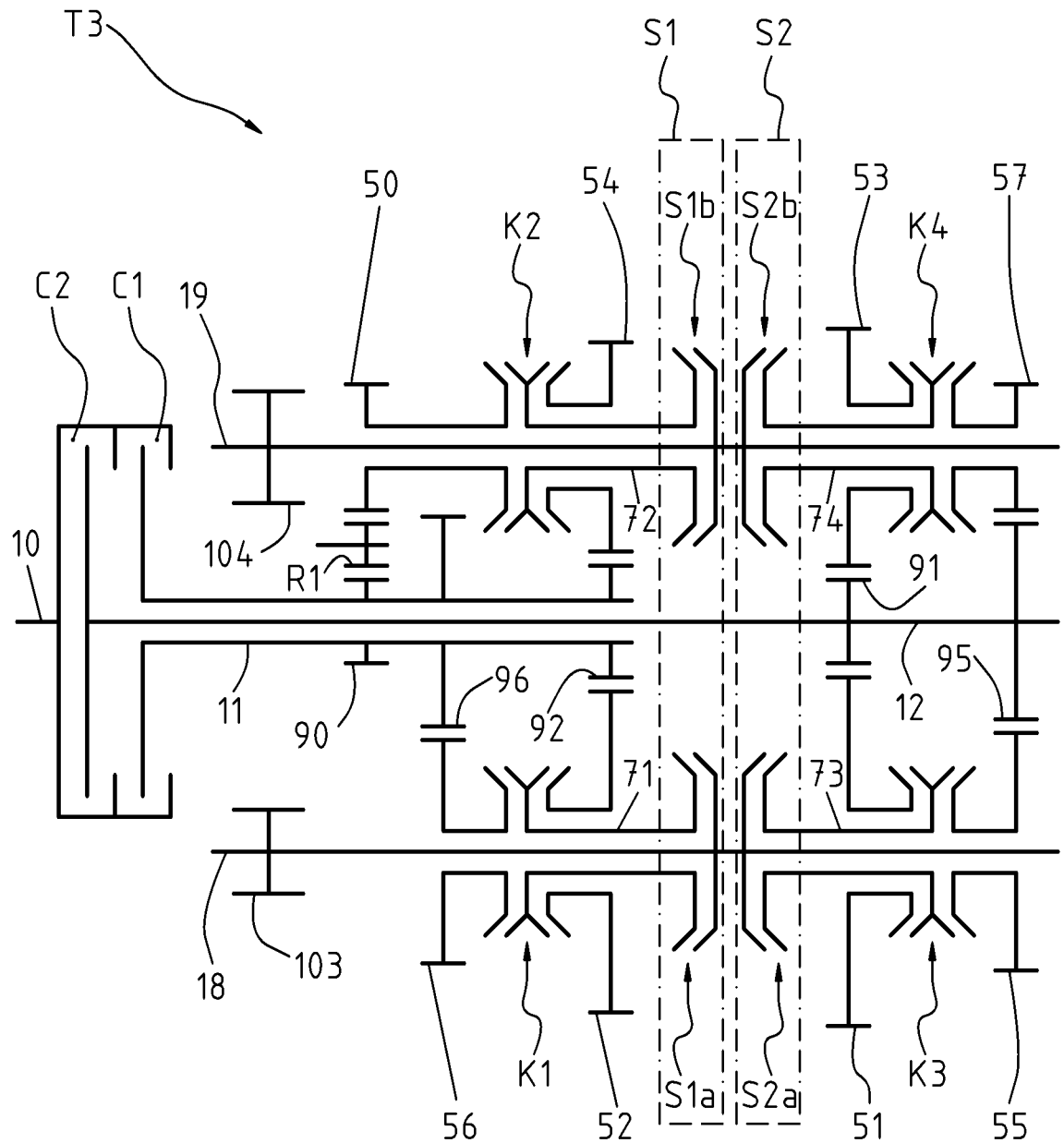
FIG. 6 is a schematic drawing illustrating an automatic manual transmission in accordance with a third embodiment of the present invention.

Referring to FIG. 6, the automatic manual transmission T3 in accordance with a third embodiment of the present invention is a double-clutch transmission which includes: a driving shaft 10, through which the torque of an engine is transmitted to a clutch unit including a first friction clutch C1, mounted between the driving shaft 10 and a first input shaft 11 and configured to transmit or interrupt the torque of the engine, and a second friction clutch C2 mounted between the shafts 10 and a second input shaft 12 and configured to transmit or interrupt the torque of the engine; intermediate shafts 71 and 73, coaxially and rotatably mounted to a first output shaft 18; intermediate shafts 72 and 74, coaxially and rotatably mounted to a second output shaft 19; a first final drive gear 103 fixedly mounted to the shaft 18; a second final drive gear 104 fixedly mounted to the shaft 19; drive gears 90, 92 and 96, fixedly mounted to the shaft 11; drive gears 91 and 95, fixedly mounted to the shaft 12; driven gears 55 and 56, idly mounted to the shaft 18; driven gears 50 and 57, idly mounted to the shaft 19; driven gear 51 idly mounted to the shaft 73; driven gear 52 idly mounted to the shaft 71; driven gear 53 idly mounted to the shaft 74; driven gear 54 idly mounted to the shaft 72; a two-way coupling device K1 mounted to the shaft 71 and configured to selectively connect the gear 52 or the gear 56 to the shaft 71; a two-way coupling device K2 mounted to the shaft 72 and configured to selectively connect the gear 54 or the gear 50 to the shaft 72; a two-way coupling device K3 mounted to the shaft 73 and configured to selectively connect the gear 51 or the gear 55 to the shaft 73; a two-way coupling device K4 mounted to the shaft 74 and configured to selectively connect the gear 53 or the gear 57 to the shaft 74; a reverse idle gear R1 permanently meshes with the gears 90 and 50 to realize the reverse rotation of the shaft 19; a first synchronization and engagement device S1 consisting of a one-sided synchronizer S1a, which is mounted to the shaft 18 and configured to connect the shaft 18 to the shaft 71, and a one-sided synchronizer S1b mounted to the shaft 19 and configured to connect the shaft 19 to the shaft 72; a second synchronization and engagement device S2 consisting of a one-sided synchronizer S2a, which is mounted to the shaft 18 and configured to connect the shaft 18 to the shaft 73, and a one-sided synchronizer S2b mounted to the shaft 19 and configured to connect the shaft 19 to the shaft 74.

The two input shafts 11 and 12 are independent, coaxial to each other and inserted one within the other. The output shafts 18 and 19 are connected via the final drive gears 103 and 104 to a transmission differential device (not shown) that transmits the motion to drive wheels (not shown). Each drive gear, 90, 91, 92, 95 and 96, permanently meshes with the corresponding driven gears: 50, 51 and 53, 52 and 54, 55 and 57, and 56, respectively. Each selectively engageable torque-transmitting coupling device, K1, K2, K3 and K4, has two engaging position in each of which it engages a respective driven gear, and an idle position. Each synchronizer, S1a, S1b, S2a and S2b, has an engaging position in which it engages a respective intermediate shaft, and an idle position.

In order to realize the transmission ratios of seven forward speeds and one reverse speed, the whole is configured so that: the torque of the engine is transmitted to the first input shaft 11 through the clutch C1 and to the second input shaft 12 through the clutch C2; the motion passes: from drive gears 91, 92, 95 and 96 to the respective driven gears 51, 52, 55 and 56, from driven gears 51 and 55 to the intermediate shaft 73 by means of the operation of the coupling device K3, from driven gears 52 and 56 to the intermediate shaft 71 by means of the operation of the coupling device K1, from intermediate shafts 71 and 73 to the output shaft 18 by means of the operation of synchronizers S1a and S2a respectively; the motion passes: from drive gears 90, 91, 92 and 95 to the respective driven gears 50, 53, 54 and 57, from driven gears 50 and 54 to the intermediate shaft 72 by means of the operation of the coupling device K2, from driven gears 53 and 57 to the intermediate shaft 74 by means of the operation of the coupling device K4, from intermediate shafts 72 and 74 to the output shaft 19 by means of the operation of synchronizers S1b and S2b respectively.

The operation of clutches and coupling and synchronization devices in this third embodiment is shown in the table of FIG. 8, where the reverse gear is indicated by the letter R, the seven forward gears are indicated by Roman numerals (first gear I, second gear II, third gear III, fourth gear IV, fifth gear V, sixth gear VI, seventh gear VII), "●" indicates the engaged state of the parts (clutches C1 and C2; synchronizers S1a, S1b, S2a and S2b; coupling devices K1, K2, K3 and K4 with the gearwheel engaged) that are active and transmit the power of the engine (i.e. the current gear), and "○" indicates the engaged state of the parts that do not transmit the power of the engine (i.e. preselected lower and higher gears). The operation of the double-clutch transmission of FIG. 6, in accordance with this third embodiment of the present invention configured as above, is described below. Specifically, the engagement modes of the reverse speed R and the seven forward speeds I-VII (in upshift from the first speed I to the seventh speed VII), starting from an idle condition in which no gear is engaged, are described.

When the transmission is to be operated in the reverse speed R, the coupling device K2 is engaged with the gear 50, the synchronizer S1b engages the shaft 72 and the first clutch C1 is engaged to transmit the torque of the engine to the input shaft 11. As a result, the motion is transmitted to the output shaft 19 via the drive gear 90, the reverse idle gear R1 and the driven gear 50 in reverse rotation.

When the transmission is to be operated in the first forward speed I, the coupling device K3 is engaged with the gear 51, the synchronizer S2a engages the shaft 73 and the first clutch C2 is engaged to transmit the torque of the engine to the input shaft 12. As a result, the motion is transmitted to the output shaft 18 via the drive gear 91 and the first speed driven gear 51. Further, the coupling device K1 is operated to preselect the power transmission path for the second forward speed II by engaging the gear 52.

To shift to the second forward speed II, the synchronizer S1a engages the shaft 71, the transmission of the engine torque is switched from the clutch C2 to the clutch C1, and thus to the first input shaft 11, and the synchronizer S2a is placed in the idle position. As a result, the motion is transmitted to the output shaft 18 via the drive gear 92 and the second speed driven gear 52. Further, while the coupling device K3 is held in an engaged state with the gear 51 to retain the preselection of the power transmission path for the first forward speed I, the coupling device K4 is operated to preselect the power transmission path for the third forward speed III by engaging the gear 53.

To shift to the third forward speed III, the synchronizer S2b engages the shaft 74, the transmission of the engine torque is switched from the clutch C1 to the clutch C2, and thus to the second input shaft 12, and the synchronizer S1a is placed in the idle position. As a result, the motion is transmitted to the output shaft 19 via the drive gear 91 and the third speed driven gear 53. Further, the coupling device K1 is held in an engaged state with the gear 52 to retain the preselection of the power transmission path for the second forward speed II and the coupling device K2 is operated to preselect the power transmission path for the fourth forward speed IV by engaging the gear 54.

To shift to the fourth forward speed IV, the synchronizer S1b engages the shaft 72, the transmission of the engine torque is switched from the clutch C2 to the clutch C1, and thus to the first input shaft 11, and the synchronizer S2b is placed in the idle position. As a result, the motion is transmitted to the output shaft 19 via the drive gear 92 and the fourth speed driven gear 54. Further the coupling device K4 is held in an engaged state with the gear 53 to retain the preselection of the power transmission path for the third forward speed III and the coupling device K3 is operated to preselect the power transmission path for the fifth forward speed V by engaging the gear 55.

To shift to the fifth forward speed V, the synchronizer S2a engages the shaft 73, the transmission of the engine torque is switched from the clutch C1 to the clutch C2, and thus to the second input shaft 12, and the synchronizer S1b is placed in the idle position. As a result, the motion is transmitted to the output shaft 18 via the drive gear 95 and the fifth speed driven gear 55. Further, the coupling device K2 is held in an engaged state with the gear 54 to retain the preselection of the power transmission path for the fourth forward speed IV and the coupling device K1 is operated to preselect the power transmission path for the sixth forward speed VI by engaging the gear 56.

To shift to the sixth forward speed VI, the synchronizer S1a engages the shaft 71, the transmission of the engine torque is switched from the clutch C2 to the clutch C1, and thus to the first input shaft 11, and the synchronizer S2a is placed in the idle position. As a result, the motion is transmitted to the output shaft 18 via the drive gear 96 and the sixth speed driven gear 56. Further, the coupling device K3 is held in an engaged state with the gear 55 to retain the preselection of the power transmission path for the fifth forward speed V and the coupling device K4 is operated to preselect the power transmission path for the seventh forward speed VII by engaging the gear 57.

To shift to the seventh forward speed VII, the synchronizer S2b engages the shaft 74, the transmission of the engine torque is switched from the clutch C1 to the clutch C2, and thus to the second input shaft 12, and the synchronizer S1a is placed in the idle position. As a result, the motion is transmitted to the output shaft 19 via the drive gear 95 and the seventh speed driven gear 57. Further, the coupling device K1 is held in an engaged state with the gear 56 to retain the preselection of the power transmission path for the sixth forward speed VI.

Figure 7:
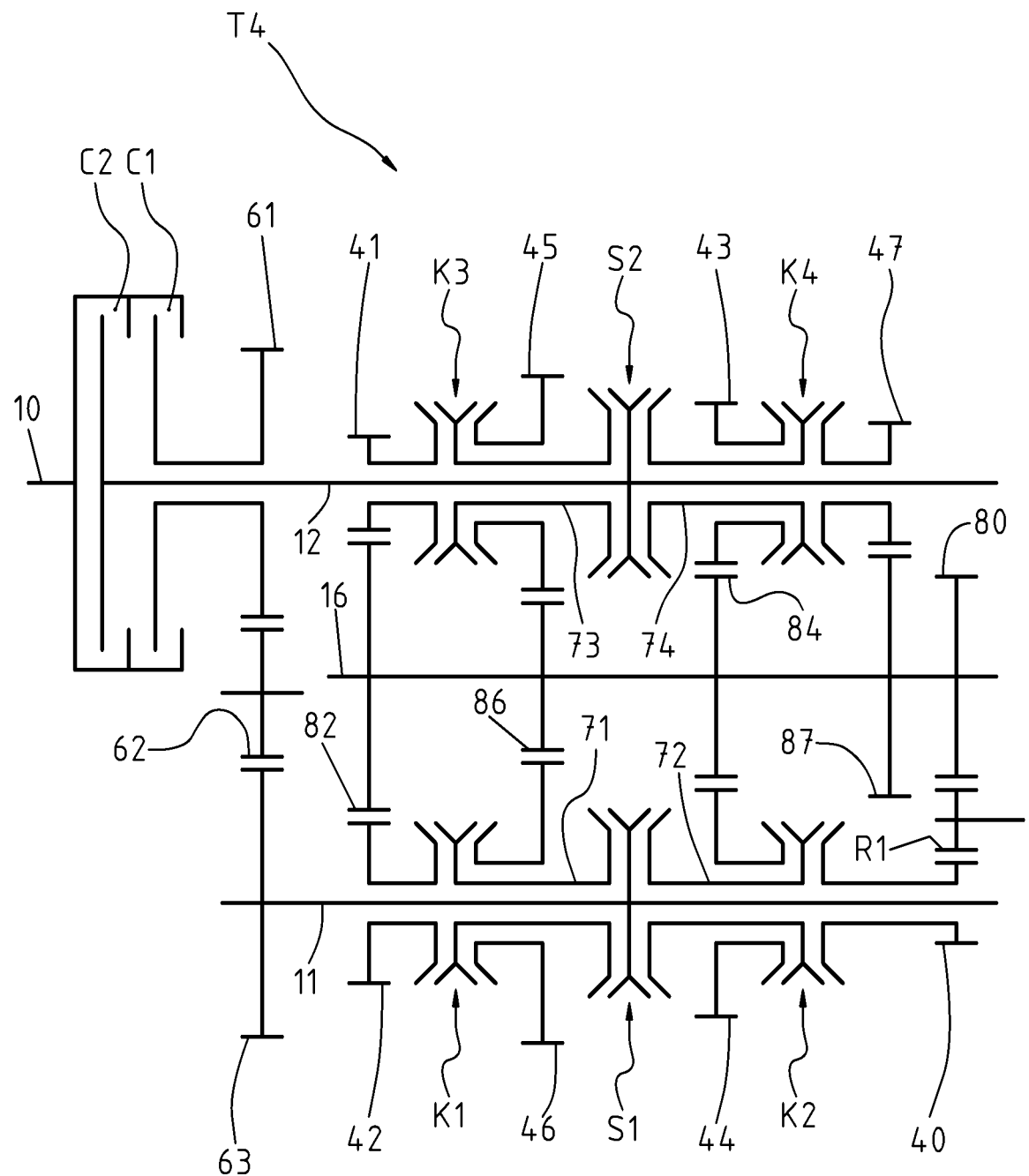
FIG. 7 is a schematic drawing illustrating an automatic manual transmission in accordance with a fourth embodiment of the present invention.

Referring to FIG. 7, the automatic manual transmission T4 in accordance with a fourth embodiment of the present invention is a double-clutch transmission which includes: a driving shaft 10, through which the torque of an engine is transmitted to a clutch unit which includes a first friction clutch C1, mounted between the driving shaft 10 and a first input shaft 11 and configured to transmit or interrupt the torque of the engine, and a second friction clutch C2, mounted between the shafts 10 and a second input shaft 12 and configured to transmit or interrupt the torque of the engine; the shaft 12 is coaxial to the clutches C1 and C2, while the shaft 11 is radially spaced apart and arranged in parallel from and to the shaft 12; the shaft 11 receives the torque of the engine via the first clutch C1, a drive gear 61, an idle gear 62, and a driven gear 63 fixedly mounted to the shaft 11 itself; drive gears 41 and 47, idly mounted to the shaft 12; two intermediate shafts, 73 and 74, coaxially and rotatably mounted to the shaft 12; a drive gear 45 idly mounted to the shaft 73; a drive gear 43 idly mounted to the shaft 74; drive gears 42 and 40, idly mounted to the shaft 11; two intermediate shafts, 71 and 72, coaxially and rotatably mounted to the shaft 11; drive gear 46 idly mounted to the shaft 71; drive gear 44 idly mounted to the shaft 72; driven gears 82, 84, 86 and 87, which are fixedly mounted to an output shaft 16 and permanently mesh with the corresponding drive gears: 41 and 42, 43 and 44, 45 and 46, and 47, respectively; a reverse idle gear R1 permanently meshes with the gear 40 and a driven gear 80 (fixedly mounted to the shaft 16) to realize the reverse rotation of the output shaft 16; a two-way coupling device K1 mounted to the shaft 71 and configured to selectively connect the gear 42 or the gear 46 to the shaft 71; a two-way coupling device K2 mounted to the shaft 72 and configured to selectively connect the gear 44 or the gear 40 to the shaft 72; a two-way coupling device K3 mounted to the shaft 73 and configured to selectively connect the gear 41 or the gear 45 to the shaft 73; a two-way coupling device K4 mounted to the shaft 74 and configured to selectively connect the gear 43 or the gear 47 to the shaft 74; a first synchronization and engagement device S1 consisting of a double-sided synchronizer mounted to the input shaft 11 and configured to selectively connect the shaft 71 or the shaft 72 to the shaft 11; a second synchronization and engagement device S2 consisting of a double-sided synchronizer mounted to the input shaft 12 and configured to selectively connect the shaft 73 or the shaft 74 to the shaft 12; the output shaft 16 is connected to a differential unit (not shown) which transmits the motion to drive wheels (not shown).

Each selectively engageable torque-transmitting coupling device, K1, K2, K3 and K4, has two engaging position in each of which it engages a respective gear, and an idle position. Each synchronizer, S1 and S2, has two engaging position in each of which it engages a corresponding intermediate shaft, and an idle position.

In order to realize the transmission ratios of seven forward speeds and one reverse speed, the whole is configured so that: the torque of the engine is transmitted to the first input shaft 11 or to the second input shaft 12 through the clutches C1 and C2 respectively; the motion passes: from the input shaft 12 to the intermediate shafts 73 and 74 by means of the operation of the synchronizer S2, from intermediate shafts 73 and 74 to the drive gears 41, 45, 43 and 47 by means of the operation of coupling devices K3 and K4, from drive gears 41, 43, 45 and 47 to the respective driven gears 82, 84, 86 and 87 and so to the output shaft 16; the motion passes: from the input shaft 11 to the intermediate shafts 71 and 72 by means of the operation of the synchronizer S1, from intermediate shafts 71 and 72 to the drive gears 42, 46, 44 and 40 by means of the operation of coupling devices K1 and K2, from drive gears 42, 46, 44 and 40 to the respective driven gears 82, 86, 84 and 80 and so to the output shaft 16.

The operation of clutches and coupling and synchronization devices in this fourth embodiment is shown in the table of FIG. 9, where the reverse gear is indicated by the letter R, the seven forward gears are indicated by Roman numerals (first gear I, second gear II, third gear III, fourth gear IV, fifth gear V, sixth gear VI and seven gear VII), "●" indicates the engaged state of the parts (clutches C1 and C2; synchronizers S1 and S2 with the intermediate shaft engaged; coupling devices K1, K2, K3 with the gearwheel engaged) that are active and transmit the power of the engine (i.e. the current gear), and "○" indicates the engaged state of the parts that do not transmit the power of the engine (i.e. preselected lower and higher gears). The operation of the double-clutch transmission of FIG. 7, in accordance with this fourth embodiment of the present invention configured as above, is described below. Specifically, the engagement modes of the reverse speed R and the seven forward speeds I-VII (in upshift from the first speed I to the seventh speed VII), starting from an idle condition in which no gear is engaged, are described.

When the transmission is to be operated in the reverse speed R, the coupling device K2 is engaged with the gear 40, the synchronizer S1 engages the shaft 72 and the clutch C1 is operated to transmit the torque of the engine to the input shaft 11. As a result, the motion is transmitted to the output shaft 16 via the reverse speed drive gear 40, the reverse idle gear R1 and the reverse speed driven gear 80.

When the transmission is to be operated in the first forward speed I, the coupling device K3 is engaged with the gear 41, the synchronizer S2 engages the shaft 73 and the second clutch C2 is operated to transmit the torque of the engine to the second input shaft 12. As a result, the motion is transmitted to the output shaft 16 via the first speed drive gear 41 and the first-second speed driven gear 82. Further, the coupling device K1 is operated to preselect the power transmission path for the second forward speed II by engaging the gear 42.

To shift to the second forward speed II, the synchronizer S1 engages the shaft 71 and the transmission of the engine torque is switched from the clutch C2 to the clutch C1, and thus to the first input shaft 11, and the synchronizer S2 is placed in the idle position. As a result, the motion is transmitted to the output shaft 16 via the second speed drive gear 42 and the first-second speed driven gear 82. Further, the coupling device K3 is held in an engaged state with the gear 41 to retain the preselection of the power transmission path for the first forward speed I and the coupling device K4 is operated to preselect the power transmission path for the third forward speed III by engaging the gear 43.

To shift to the third forward speed III, the synchronizer S2 engages the shaft 74 and the transmission of the engine torque is switched from the clutch C1 to the clutch C2, and thus to the second input shaft 12, and the synchronizer S1 is placed in the idle position. As a result, the motion is transmitted to the output shaft 16 via the third speed drive gear 43 and the third-fourth speed driven gear 84. Further, the coupling device K1 is held in an engaged state with the gear 42 to retain the preselection of the power transmission path for the second forward speed II and the coupling device K2 is operated to preselect the power transmission path for the fourth forward speed IV by engaging the gear 44.

To shift to the fourth forward speed IV, the synchronizer S1 engages the shaft 72, the transmission of the engine torque is switched from the clutch C2 to the clutch C1, and thus to the first input shaft 11, and the synchronizer S2 is placed in the idle position. As a result, the motion is transmitted to the output shaft 16 via the fourth speed drive gear 44 and the third-fourth speed driven gear 84. Further, the coupling device K4 is held in an engaged state with the gear 43 to retain the preselection of the power transmission path for the third forward speed III and the coupling device K3 is operated to preselect the power transmission path for the fifth forward speed V by engaging the gear 45.

To shift to the fifth forward speed V, the synchronizer S2 engages the shaft 73, the transmission of the engine torque is switched from the clutch C1 to the clutch C2, and thus to the second input shaft 12, and the synchronizer S1 is placed in the idle position. As a result, the motion is transmitted to the output shaft 16 via the fifth speed drive gear 45 and the fifth-sixth speed driven gear 86. Further, the coupling device K2 is held in an engaged state with the gear 44 to retain the preselection of the power transmission path for the fourth forward speed IV and the coupling device K1 is operated to preselect the power transmission path for the sixth forward speed VI by engaging the gear 46.

To shift to the sixth forward speed VI, the synchronizer S1 engages the shaft 71, the transmission of the engine torque is switched from the clutch C2 to the clutch C1, and thus to the first input shaft 11, and the synchronizer S2 is placed in the idle position. As a result, the motion is transmitted to the output shaft 16 via the sixth speed drive gear 46 and the fifth-sixth speed driven gear 86. Further, the coupling device K3 is held in an engaged state with the drive gear 45 to retain the preselection of the power transmission path for the fifth forward speed V and the coupling device K4 is operated to preselect the power transmission path for the seventh forward speed VII by engaging the gear 47

To shift to the seventh forward speed VII, the synchronizer S2 is operated to engage the shaft 74, the transmission of the engine torque is switched from the clutch C1 to the clutch C2, and thus to the first input shaft 12, and the synchronizer S1 is placed in the idle position. As a result, the motion is transmitted to the output shaft 16 via the seventh speed drive gear 47 and the seventh speed driven gear 87. Further, the coupling device K1 is held in an engaged state with the drive gear 46 to retain the preselection of the power transmission path for the sixth forward speed VI.

The illustrated embodiments of the present invention have six or seven forward speeds and one reverse speed, but it will be evident for those skilled in the art that a transmission with a different number of speeds can be easily derived from any described embodiment.

The embodiments provided in this description and illustrated in the accompanying drawings are examples given for an illustration purpose only and it will be apparent, to those skilled in the art, that various modifications and equivalent embodiments can be made without departing from the spirit and the scope of the present invention, and that the present invention can be applied to products other than a vehicle. Therefore, all such equivalent embodiments and different applications are intended to be covered by the appended claims.

The invention claimed is:

1. Automatic manual transmission (T2) consisting of a double-clutch gearbox which is divided into two sub-transmissions and includes two clutches (C1, C2), in one clutch (C1) transmits the power of an engine to a first sub-transmission through a first input shaft (11) and the other clutch (C2) transmits the power of the engine to a second sub-transmission through a second input shaft (12), and wherein:

said first sub-transmission is configured for establishing the even-numbered forward gears, $2^{nd}$, $4^{th}$ and $6^{th}$, and the reverse gear by means of a first plurality of pairs of gear wheels (42/52, 44/54, 46/56, 40/50) which forms a first a power transmission path to transmit the power of the engine from said first input shaft (11) to a first output shaft (14) and in which each pair of gear wheels defines a respective gear and comprises a drive gear wheel fixedly mounted on said first input shaft (11) and a driven gear wheel that permanently meshes with the drive gear wheel;

said second sub-transmission is configured for establishing the odd-numbered forward gears, $1^{st}$, $3^{rd}$, $5^{th}$ and $7^{th}$, by means of a second plurality of pairs of gear wheels (41/51, 43/53, 45/55, 47/57) which forms a second power transmission path to transmit the power of the engine from said second input shaft (12) to a second output shaft (15) and in which each pair of gear wheels defines a respective gear and comprises a drive gear wheel fixedly mounted on said second input shaft (12) and a driven gear wheel that permanently meshes with the drive gear wheel;

said first sub-transmission includes a first set of intermediate shafts which comprises a first (71) and a second (72) intermediate shaft which are coaxially and rotatably mounted to said first output shaft (14) and kinematically interposed between said first input shaft (11) and said first output shaft (14);

said second sub-transmission includes a second set of intermediate shafts which comprises a third (73) and a fourth (74) intermediate shaft which are coaxially and rotatably mounted to said second output shaft (15) and kinematically interposed between said second input shaft (12) and said second output shaft (15);

each driven gear wheel of said first and second pluralities of pairs of gear wheels of said first and second sub-transmissions is idly mounted to the first (14) or to the second (15) output shaft or to an intermediate shaft of said first and second sets of intermediate shafts;

said first sub-transmission includes a first set of selectively engageable torque-transmitting coupling devices (K1, K2) each of which is mounted to an intermediate shaft of said first set of intermediate shafts and coupled to the driven gear wheels of two adjacent pairs of gear wheels, of said first plurality of pairs of gear wheels of said first sub-transmission, which define two non-consecutive even-numbered forward gears separated by either a single intermediate even-numbered gear or an even-numbered gear and the reverse gear;

said second sub-transmission includes a second set of selectively engageable torque-transmitting coupling devices (K3, K4) each of which is mounted to an intermediate shaft of said second set of intermediate shafts and coupled to the driven gear wheels of two adjacent pairs of gear wheels, of said second plurality of pairs of gear wheels of said second sub-transmission, which define two non-consecutive odd-numbered forward gears separated by a single intermediate odd-numbered gear, and wherein the automatic manual transmission is characterized in that:

said first plurality of pairs of gear wheels (42/52, 44/54, 46/56, 40/50) and said first set of intermediate shafts (71, 72) are only part of said first power transmission path of said first sub-transmission; said second plurality of pairs of gear wheels (41/51, 43/53, 45/55, 47/57) and said second set of intermediate shafts (73, 74) are only part of said second power transmission path of said second sub-transmission;

said first set of selectively engageable torque-transmitting coupling devices comprises a first coupling device (K1), which is mounted to said first intermediate shaft (71) and adapted to be actuated for selectively and alternately connecting said first intermediate shaft (71) with the driven gear wheel (52) of the pair of gear wheels which defines the $2^{nd}$ gear and with the driven gear wheel (56) of the pair of gear wheels which defines the $6^{th}$ gear, and a second coupling device (K2) which is mounted to said second intermediate shaft (72) and adapted to be actuated for selectively and alternately connecting said second intermediate shaft (72) with the driven gear wheel (54) of the pair of gear wheels which defines the $4^{th}$ gear and with the driven gear wheel (50) of the pair of gear wheels which defines the reverse gear;

said second set of selectively engageable torque-transmitting coupling devices comprises a third coupling device (K3), which is mounted to said third intermediate shaft (73) and adapted to be actuated for selectively and alternately connecting said third intermediate shaft (73) with the driven gear wheel (51) of the pair of gear wheels which defines the $1^{st}$ gear and with the driven gear wheel (55) of the pair of gear wheels which defines the $5^{th}$ gear, and a fourth coupling device (K4) which is mounted to said fourth intermediate shaft (74) and adapted to be actuated for selectively and alternately connecting said fourth intermediate shaft (74) with the driven gear wheel (53) of the pair of gear wheels which defines the $3^{rd}$ gear and with the driven gear wheel (57) of the pair of gear wheels which defines the $7^{th}$ gear;

said first sub-transmission is connected and disconnected to and from the output of the transmission solely by means of a first double-sided synchronizer (S1) which is mounted to said first output shaft (14) and adapted to be actuated for selectively and alternately connecting said first output shaft with said first (71) and with said second (72) intermediate shaft;

said second sub-transmission is connected and disconnected to and from the output of the transmission solely by means of a second double-sided synchronizer (S2) which is mounted to said second output shaft (15) and adapted to be actuated for selectively and alternately connecting said second output shaft with said third (73) and with said fourth (74) intermediate shaft.

2. Automatic manual transmission (T1) consisting of a double-clutch gearbox which is divided into two sub-transmissions and includes two clutches (C1, C2), one clutch (C1) transmits the power of an engine to a first sub-transmission through a first input shaft (11) and the other clutch (C2) transmits the power of the engine to a second sub-transmission through a second input shaft (12), wherein:

said first sub-transmission is configured for establishing the even-numbered forward gears, $2^{nd}$, $4^{th}$ and $6^{th}$, and the reverse gear by means of a first plurality of pairs of gear wheels (42/52, 44/54, 46/56, 40/50) which forms a first a power transmission path to transmit the power of the engine from said first input shaft (11) to one output shaft (16) and in which each pair of gear wheels defines a respective gear and comprises a drive gear wheel fixedly mounted on said first input shaft (11) and a driven gear wheel that permanently meshes with the drive gear wheel;

said second sub-transmission is configured for establishing the odd-numbered forward gears, $1^{st}$, $3^{rd}$, and $5^{th}$; by means of a second plurality of pairs of gear wheels (41/51, 43/53, 45/55) which forms a second power transmission path to transmit the power of the engine from said second input shaft (12) to said output shaft (16) and in which each pair of gear wheels defines a respective gear and comprises a drive gear wheel fixedly mounted on said second input shaft (12) and a driven gear wheel that permanently meshes with the drive gear wheel;

said first sub-transmission includes a first set of intermediate shafts which are coaxially and rotatably mounted to said output shaft (16) and kinematically interposed between said first input shaft (11) and said output shaft (16);

said second sub-transmission includes a second set of intermediate shafts which are coaxially and rotatably mounted to said output shaft (16) and kinematically interposed between said second input shaft (12) and said output shaft (16);

said first set of intermediate shafts comprises a first (71) and a second (72) intermediate shaft, and said second set of intermediate shafts comprises a third intermediate shaft (73);

each driven gear wheel of said first and second pluralities of pairs of gear wheels of said first and second sub-transmissions is idly mounted to said output shaft (16) or to an intermediate shaft of said first and second sets of intermediate shafts;

said first sub-transmission comprises a first set of selectively engageable torque-transmitting coupling devices (K1, K2) each of which is mounted to an intermediate shaft of said first set of intermediate shafts and coupled to the driven gear wheels of two adjacent pairs of gear wheels, of said first plurality of pairs of gear wheels of said first sub-transmission, which define two non-consecutive even-numbered forward gears separated by either a single intermediate even-numbered gear or an even-numbered gear and the reverse gear;

said second sub-transmission comprises a second set of selectively engageable torque-transmitting coupling devices (K3) each of which is mounted to an intermediate shaft of said second set of intermediate shafts and coupled to the driven gear wheels of two adjacent pairs of gear wheels, of said second plurality of pairs of gear wheels of said second sub-transmission, which define two non-consecutive odd-numbered forward gears separated by a single intermediate odd-numbered gear, and wherein the automatic manual transmission is characterized in that:

said first plurality of pairs of gear wheels (42/52, 44/54, 46/56, 40/50) and said first set of intermediate shafts (71, 72) are only part of said first power transmission path of said first sub-transmission; said second plurality of pairs of gear wheels (41/51, 43/53, 45/55) and said second set of intermediate shafts (73) are only part of said second power transmission path of said second sub-transmission;

said first set of selectively engageable torque-transmitting coupling devices comprises a first coupling device (K1), which is mounted to said first intermediate shaft (71) and adapted to be actuated for selectively and alternately connecting said first intermediate shaft (71) with the driven gear wheel (52) of the pair of gear wheels which defines the $2^{nd}$ gear and with the driven gear wheel (56) of the pair of gear wheels which defines the $6^{th}$ gear, and a second coupling device (K2) which is mounted to said second intermediate shaft (72) and adapted to be actuated for selectively and alternately connecting said second intermediate shaft (72) with the driven gear wheel (54) of the pair of gear wheels which defines the $4^{th}$ gear and with the driven gear wheel (50) of the pair of gear wheels which defines the reverse gear;

said second set of selectively engageable torque-transmitting coupling devices comprises a third coupling device (K3) which is mounted to said third intermediate shaft (73) and adapted to be actuated for selectively and alternately connecting said third intermediate shaft (73) with the driven gear wheel (51) of the pair of gear wheels which defines the $1^{st}$ gear and with the driven gear wheel (55) of the pair of gear wheels which defines the $5^{th}$ gear;

said first sub-transmission is connected and disconnected to and from the output of the transmission solely by means of a first double-sided synchronizer (S1) which is mounted to said output shaft (16) and adapted to be actuated for selectively and alternately connecting said output shaft (16) with said first (71) and with said second (72) intermediate shaft;

said second sub-transmission is connected and disconnected to and from the output of the transmission solely by means of a second double-sided synchronizer (S2) which is mounted to said output shaft (16) and adapted to be actuated for selectively and alternately connecting said output shaft (16) with said third intermediate shaft (73) and with the driven gear wheel (53) of the pair of gear wheels which defines the $3^{rd}$ gear.

3. Automatic manual transmission (T3) consisting of a double-clutch gearbox which is divided into two sub-transmissions and includes two clutches (C1, C2), one clutch (C1) transmits the power of an engine to a first sub-transmission through a first input shaft (11) and the other clutch (C2) transmits the power of the engine to a second sub-transmission through a second input shaft (12), wherein:

said first sub-transmission is configured for establishing the even-numbered forward gears, $2^{nd}$, $4^{th}$ and $6^{th}$, and the reverse gear by means of a first plurality of pairs of gear wheels (92/52, 92/54, 96/56, 90/50) which forms a first a power transmission path to transmit the power of the engine from said first input shaft (11) to a first (18) and to a second (19) output shaft and in which each pair of gear wheels defines a respective gear and comprises a drive gear wheel fixedly mounted on said first input shaft (11) and a driven gear wheel that permanently meshes with the drive gear wheel;

said second sub-transmission is configured for establishing the odd-numbered forward gears, $1^{st}$, $3^{rd}$, $5^{th}$ and $7^{th}$, by means of a second plurality of pairs of gear wheels (91/51, 91/53, 95/55, 95/57) which forms a second power transmission path to transmit the power of the engine from said second input shaft (12) to said first (18) and second (19) output shafts and in which each pair of gear wheels defines a respective gear and comprises a drive gear wheel fixedly mounted on said second input shaft (12) and a driven gear wheel that permanently meshes with the drive gear wheel;

said first sub-transmission includes a first set of intermediate shafts which comprises a first intermediate shaft (71), which is coaxially and rotatably mounted to said first output shaft (18) and kinematically interposed between said first input shaft (11) and said first output shaft (18), and a second intermediate shaft (72) which is coaxially and rotatably mounted to said second output shaft (19) and kinematically interposed between said first input shaft (11) and said second output shaft (19);

said second sub-transmission includes a second set of intermediate shafts which comprises a third intermediate shaft (73), which is coaxially and rotatably mounted to said first output shaft (18) and kinematically interposed between said second input shaft (12) and said first output shaft (18), and a fourth (74) intermediate shaft which is coaxially and rotatably mounted to said second output shaft (19) and kinematically interposed between said second input shaft (12) and said second output shaft (19);

each driven gear wheel of said first and second pluralities of pairs of gear wheels of said first and second sub-transmissions is idly mounted to the first (18) or to the second (19) output shaft or to an intermediate shaft of said first and second sets of intermediate shafts;

said first sub-transmission includes a first set of selectively engageable torque-transmitting coupling devices (K1, K2) each of which is mounted to an intermediate shaft of said first set of intermediate shafts and coupled to the driven gear wheels of two adjacent pairs of gear wheels, of said first plurality of pairs of gear wheels of said first sub-transmission, which define two non-consecutive even-numbered forward gears separated by either a single intermediate even-numbered gear or an even-numbered gear and the reverse gear;

said second sub-transmission includes a second set of selectively engageable torque-transmitting coupling devices (K3, K4) each of which is mounted to an intermediate shaft of said second set of intermediate shafts and coupled to the driven gear wheels of two adjacent pairs of gear wheels, of said second plurality of pairs of gear wheels of said second sub-transmission, which define two non-consecutive odd-numbered forward gears separated by a single intermediate odd-numbered gear, and wherein the automatic manual transmission is characterized in that:

said first plurality of pairs of gear wheels (92/52, 92/54, 96/56, 90/50) and said first set of intermediate shafts (71, 72) are only part of said first power transmission path of said first sub-transmission; said second plurality of pairs of gear wheels (91/51, 91/53, 95/55, 95/57) and said second set of intermediate shafts (73, 74) are only part of said second power transmission path of said second sub-transmission;

said first set of selectively engageable torque-transmitting coupling devices comprises a first coupling device (10), which is mounted to said first intermediate shaft (71) and adapted to be actuated for selectively and alternately connecting said first intermediate shaft (71) with the driven gear wheel (52) of the pair of gear wheels which defines the $2^{nd}$ gear and with the driven gear wheel (56) of the pair of gear wheels which defines the $6^{th}$ gear, and a second coupling device (K2) which is mounted to said second intermediate shaft (72) and adapted to be actuated for selectively and alternately connecting said second intermediate shaft (72) with the driven gear wheel (54) of the pair of gear wheels which defines the $4^{th}$ gear and with the driven gear wheel (50) of the pair of gear wheels which defines the reverse gear;

said second set of selectively engageable torque-transmitting coupling devices comprises a third coupling device (K3), which is mounted to said third intermediate shaft (73) and adapted to be actuated for selectively and alternately connecting said third intermediate shaft (73) with the driven gear wheel (51) of the pair of gear wheels which defines the $1^{st}$ gear and with the driven gear wheel (55) of the pair of gear wheels which defines the $5^{th}$ gear, and a fourth coupling device (K4) which is mounted to said fourth intermediate shaft (74) and adapted to be actuated for selectively and alternately connecting said fourth intermediate shaft (74) with the driven gear wheel (53) of the pair of gear wheels which defines the $3^{rd}$ gear and with the driven gear wheel (57) of the pair of gear wheels which defines the $7^{th}$ gear;

said first sub-transmission is connected and disconnected to and from the output of the transmission solely by means of a first synchronizer device (S1) consisting of a first one-sided synchronizer (S1a), which is mounted to said first output shaft (18) and adapted to be actuated for mechanically coupling said first output shaft (18) with said first intermediate shaft (71), and of a second one-sided synchronizer (S1b) which is mounted to said second output shaft (19) and adapted to be actuated for mechanically coupling said second output shaft (19) with said second intermediate shaft (72);

said second sub-transmission is connected and disconnected to and from the output of the transmission solely by means of a second synchronizer device (S2) consisting of a third one-sided synchronizer (S2a), which is mounted to said first output shaft (18) and adapted to be actuated for mechanically coupling said first output shaft (18) with said third intermediate shaft (73), and of a fourth one-sided synchronizer (S2b) which is mounted to said second output shaft (19) and adapted to be actuated for mechanically coupling said second output shaft (19) with said fourth intermediate shaft (74).

4. Method of operating an automatic manual transmission as claimed in claim 1 or 3 to shift from one engaged gear G to the immediately lower gear G1 or to the immediately higher gear G2, wherein said gear G is each of the forward gears from $1^{st}$ gear to $7^{th}$ gear and the method comprises the steps of:

placing the synchronizer (S1, S2) which is associated to said gears G1 and G2 in the idle position;

preselecting the power transmission paths for said gears G1 and G2 by engaging the corresponding driven gear wheels by means of the actuation of the coupling devices that compose the appropriate set between said first (10, K2) and second (K3, K4) sets of torque-transmitting coupling devices;

receiving a gear shifting command;

mechanically coupling the intermediate shaft which corresponds to said immediately lower gear G1 or to said immediately higher gear G2 to the corresponding output shaft by means of the actuation of the synchronizer (S1, S2) associated to said gears G1 and G2;

opening the clutch associated to said gear G and closing the clutch which is associated to said gears G1 and G2, wherein closing the clutch associated to said gears G1 and G2 includes a starting step of bringing the same clutch to the contact point, and wherein the method is characterized in that:

said step of placing the synchronizer (S1, S2) which is associated to said gears G1 and G2 in the idle position implies mechanically decoupling the pairs of gear wheels and the coupling devices corresponding to said gear G1 and to said gear G2 from the corresponding output shaft and therefore from the output of the transmission;

said step of preselecting the power transmission paths for said gears G1 and G2 implies that driven gear wheels associated to said gears G1 and G2 are engaged to the corresponding intermediate shafts independently of each other, so that said immediately lower gear G1 and said immediately higher gear G2 are preselected at the same time;

and said step of mechanically coupling the intermediate shaft which corresponds to said immediately lower gear G1 or to said immediately higher gear G2 to the corresponding output shaft overlaps said starting step of bringing the clutch associated to said gears G1 and G2 to the contact point.

5. Method of operating an automatic manual transmission as claimed in claim 2 to shift from one engaged gear G to the immediately lower gear G1 or to the immediately higher gear G2, wherein said gear G is each of the forward gears from $1^{st}$ gear to $6^{th}$ gear and the method comprises the steps of:

placing the synchronizer (S1, S2) which is associated to said gears G1 and G2 in the idle position;

preselecting the power transmission paths for said gears G1 and G2 by engaging the corresponding drive gear wheels by means of the actuation of the coupling devices that compose the appropriate set between said first (K1, K2) and second (K3) sets of torque-transmitting coupling devices;

receiving a gear shifting command;

mechanically coupling the intermediate shaft which corresponds to said immediately lower gear G1 or to said immediately higher gear G2 to the output shaft by means of the actuation of the synchronizer (S1, S2) associated to said gears G1 and G2;

opening the clutch associated to said gear G; closing the clutch which is associated to said gears G1 and G2, wherein closing the clutch associated to said gears G1 and G2 includes a starting step of bringing the same clutch to the contact point, and wherein the method is characterized in that:

said step of placing the synchronizer (S1, S2) which is associated to said gears G1 and G2 in the idle position implies mechanically decoupling the pairs of gear wheels and the coupling devices corresponding to said gears G1 and G2 from the output shaft and therefore from the output of the transmission;

said step of preselecting the power transmission paths for said gears G1 and G2 implies that drive gear wheels associated to said gears G1 and G2 are engaged to the corresponding intermediate shafts independently of each other, so that said immediately lower gear G1 and said immediately higher gear G2 are preselected at the same time;

and said step of mechanically coupling the intermediate shaft which corresponds to said immediately lower gear G1 or to said immediately higher gear G2 to the output shaft overlaps said starting step of bringing the clutch associated to said gears G1 and G2 to the contact point.

6. Method of operating an automatic manual transmission according to any one of claims 1, 2, 3, wherein a gear shifting $A_B$ to shift up or down from one engaged gear $G_A$ to the next gear $G_B$ includes the steps of:

receiving a gear shifting command;

engaging said gear $G_B$ by means of the synchronizer associated to the same gear;

switching the torque transmission between the two clutches (C1, C2) by progressively opening a first clutch which is associated to said gear $G_A$, and progressively increasing the torque transmitted through a second clutch which is associated to said gear $G_B$, until said first clutch is placed at the contact point at a first moment $t_1$ and the transmission of the engine torque to the driving wheels is completely transferred to said second clutch;

and where during the gear shifting which is immediately successive to said gear shifting $A_B$ the automatic manual transmission switches the torque transmission from said second clutch to said first clutch and starts to increase the torque transmitted through said first clutch at a second moment $t_2$, wherein the method is characterized in that:

said first clutch is constantly held at the contact point during the entire period of time between said first moment $t_1$, in which said first clutch is placed at the contact point, and said second moment $t_2$, in which the automatic manual transmission starts to increase the torque transmitted through said first clutch from the torque level corresponding to the contact point, so that the moment the automatic manual transmission receives a gear shifting command for shifting up or down from one engaged gear to a next gear the clutch which is associated to the next gear is already at the contact point.

* * * * *